(12) United States Patent
Wang et al.

(10) Patent No.: US 8,576,180 B2
(45) Date of Patent: Nov. 5, 2013

(54) METHOD FOR SWITCHING TOUCH KEYBOARD AND HANDHELD ELECTRONIC DEVICE AND STORAGE MEDIUM USING THE SAME

(75) Inventors: Hui-Wen Wang, Taoyuan County (TW); Chia-Chun Li, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 1065 days.

(21) Appl. No.: 12/342,077

(22) Filed: Dec. 23, 2008

(65) Prior Publication Data

US 2009/0167716 A1 Jul. 2, 2009

(30) Foreign Application Priority Data

Dec. 31, 2007 (TW) ................. 96151559 A (51) Int. Cl.
 *G06F 3/041* (2006.01)
(52) U.S. Cl.
 USPC ........................................................ 345/173
(58) Field of Classification Search
 None
 See application file for complete search history.

(56) References Cited

U.S. PATENT DOCUMENTS

| 2005/0114788 | A1 | 5/2005 | Fabritius | |
|---|---|---|---|---|
| 2005/0140660 | A1* | 6/2005 | Valikangas | 345/173 |
| 2008/0204402 | A1* | 8/2008 | Hirata et al. | 345/156 |
| 2008/0259039 | A1* | 10/2008 | Kocienda et al. | 345/173 |
| 2008/0318635 | A1* | 12/2008 | Yoon et al. | 455/566 |
| 2009/0002321 | A1* | 1/2009 | Kumamoto | 345/168 |

FOREIGN PATENT DOCUMENTS

| CN | 1882905 | 12/2006 |
|---|---|---|
| CN | 101034322 | 9/2007 |
| TW | 200703118 | 1/2007 |
| TW | 200723032 | 6/2007 |
| WO | 2007086371 | 8/2007 |

OTHER PUBLICATIONS

"Search Report of European counterpart application", issued on Apr. 15, 2009, p. 1-p. 6.
"First Office Action of European Counterpart Application", issued on Jun. 15, 2011, p. 1-p. 5.
"Office Action of Taiwan Counterpart Application", issued on Apr. 29, 2011 p. 1-p. 8.
"Fourth Office Action of China Counterpart Application", issued on Oct. 10, 2011, p. 1-p. 5.
"1st Office Action of China counterpart application" issued on Mar. 2, 2010, p. 1-p. 4.

* cited by examiner

*Primary Examiner* — Joseph Haley
*Assistant Examiner* — Emily Frank
(74) *Attorney, Agent, or Firm* — Jianq Chyun IP Office (57) ABSTRACT

A method for switching a touch keyboard and a handheld electronic device and a storage medium using the method are provided. The method is suitable for a handheld electronic device having a touch screen. In the method, a character input function is first activated to display a first type touch keyboard on a side of the touch screen. A touch signal produced within a display area of the first type touch keyboard is then received and it is determined whether the touch signal moves to another side of the touch screen. If the touch signal is determined to move to the another side of the touch screen, a second type touch keyboard is displayed on the another side of the touch screen. Accordingly, the users can switch the touch keyboard to another one conveniently so as to input characters.

18 Claims, 10 Drawing Sheets

METHOD FOR SWITCHING TOUCH KEYBOARD AND HANDHELD ELECTRONIC DEVICE AND STORAGE MEDIUM USING THE SAME

CROSS-REFERENCE TO RELATED APPLICATION

This application claims the priority benefit of Taiwan application serial no. 96151559, filed on Dec. 31, 2007. The entirety of the above-mentioned patent application is hereby incorporated by reference herein and made a part of specification.

BACKGROUND OF THE APPLICATION

1. Field of the Application

The present application relates generally to a method for switching a keyboard, and more particularly, to a method for switching a touch keyboard.

2. Description of Related Art

To keep up with the quick rhythm of modern people's life, various innovative handheld electronic devices that occupy less space and are easy to carry are being introduced. Taking a personal digital assistant (PDA) phone as an example, it not only has functions of the conventional communication devices, but also permits the user to draft files, receive/send emails, surf the internet, or use instant communication software through the internal Windows operating system. In other words, such handheld electronic devices can not only be used to make a call, but also provide various functions like a small-sized personal computer. Therefore, such devices have been indispensable for those who strive for efficiency for everything they are working on.

However, for the handheld electronic device that is required to be light, thin, short, and small, there is a strict limitation on the size of the device. If a display and a keyboard are incorporated into the device, the size of the display must be reduced. In order to provide a relatively large display in the limited space, a touch screen has recently been developed in which a keyboard is integrated into the touch screen as an input interface of the handheld electronic device. As such, the cost of the conventional keyboard and the area the conventional keyboard occupies are eliminated. In addition, when compared to the conventional keyboard, the operation of the touch keyboard is also advantageous in its simpleness and intuition. The user may choose to input characters on the display with stylus click or direct finger press.

Figure 1:
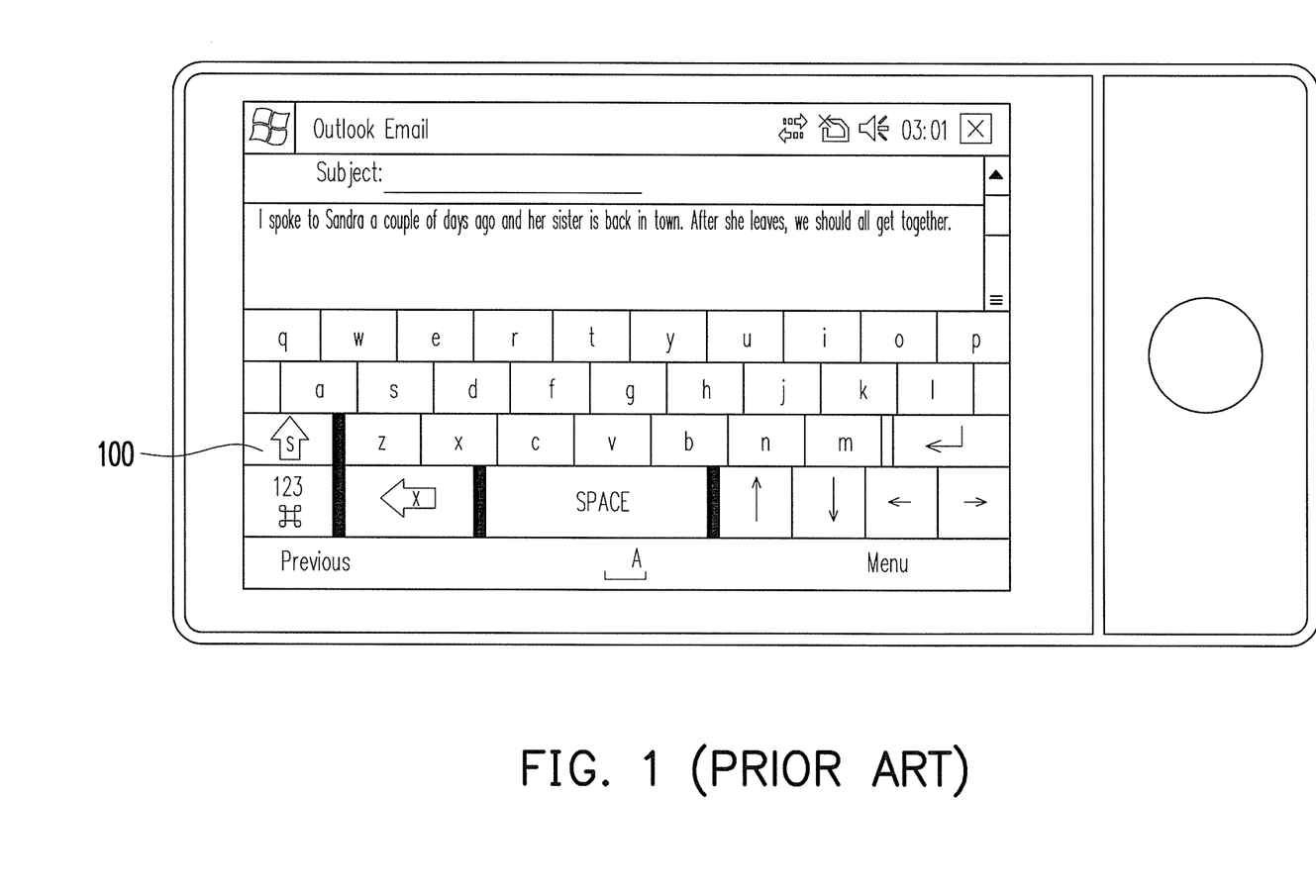
FIG. 1 shows a configuration of an English letter keyboard of a conventional handheld electronic device.
Figure 2:
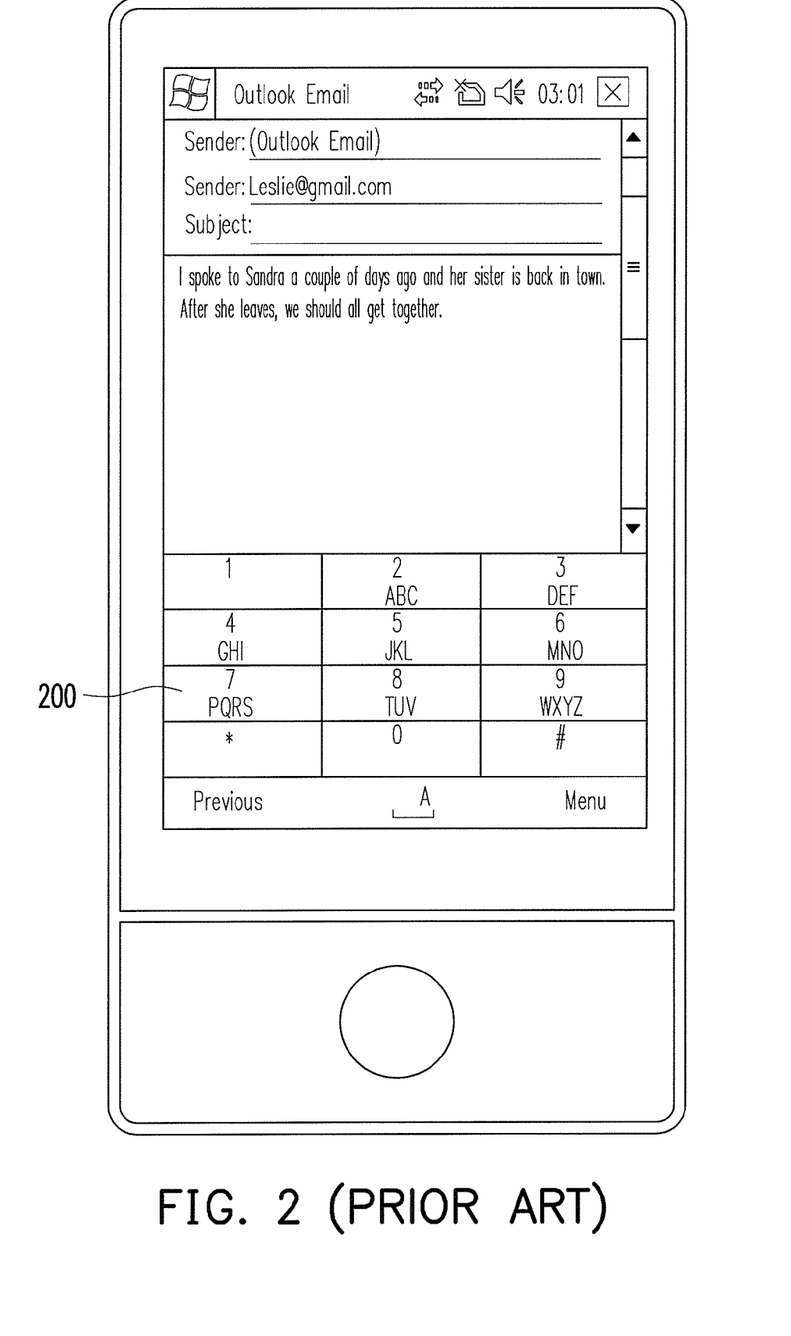
FIG. 2 shows a configuration of a numeric keyboard of a conventional handheld electronic device.

To facilitate the user holding and operating the device, the shape of the handheld electronic device is typically configured to be rectangular and the equipped touch screen also includes long and short sides. When operating the touch screen, the user can operate with single hand or both hands based on the user's habits or needs. For example, when it is desired to input English characters, the user can hold the handheld electronic device in a landscape orientation and touch the English letter keyboard (e.g., English letter keyboard 100 shown in FIG. 1) displayed on the touch screen with both hands to speed up the English character input. On the other hand, when the user needs only to input common numerals, the user can hold the handheld electronic device in a portrait orientation and touch a numeric keyboard (e.g., the numeric keyboard 200 shown in FIG. 2) displayed on the touch screen with single hand to quickly input the numerals.

Figure 3:
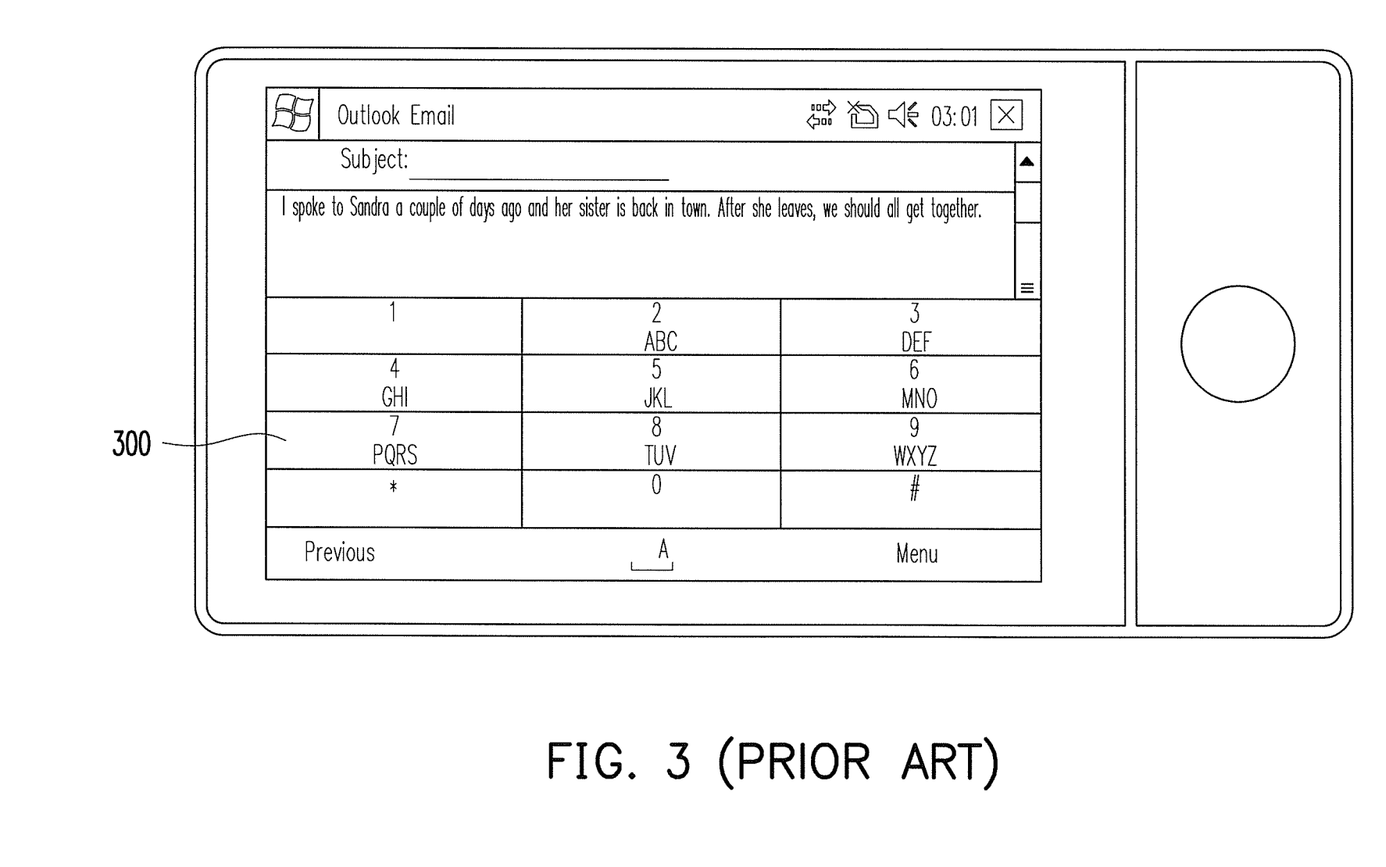
FIG. 3 shows a configuration of a numeric keyboard of a conventional handheld electronic device.

However, in the construction described above, the touch keyboard can only be displayed on a single side of the touch screen and the location of the touch keyboard cannot be varied based on the manner the user holds the handheld electronic device and the type of the touch keyboard needed. For example, when the handheld electronic device is disposed in the landscape orientation, if the user desires to change to operate the English letter keyboard to input English letters with single-hand (e.g., right-hand) operation, keys on a side opposite from the holding portion of the device cannot easily be pressed, thus making the operation inconvenient. As another example, when the user needs to change from the English letter input to a numeral input, the user must switch the touch keyboard to the numeric keyboard (e.g., the numeric keyboard 300 shown in FIG. 3) and operates the numeric keyboard to input numerals. However, to the user who desires to operate with single hand (e.g., right hand), the manner that the numeric keyboard is displayed on the long side of the touch screen may make the operation inconvenient because some keys (e.g., the key "1") are located too far away.

SUMMARY OF THE APPLICATION

Accordingly, the present application provides a method for switching a touch keyboard, which facilitates the user inputting characters by displaying different types of touch keyboard on different sides of a touch screen.

The present application provides a method for switching a touch keyboard suitable for a handheld electronic device having a touch screen. In this method, a character input function is firstly activated and a first type touch keyboard is displayed on a side of the touch screen. When a touch signal produced within a display area of the first type touch keyboard is received, it is determined whether the touch signal moves to another side of the touch screen. If the touch signal moves to the another side of the touch screen, a second type touch keyboard is displayed on the another side of the touch screen.

According to one embodiment of the present application, the touch signal is produced by continuously touching a touch point within the display area of the first type touch keyboard.

According to one embodiment of the present application, the touch point is located in a specific area within the display area of the first type touch keyboard excluding a key.

According to one embodiment of the present application, the step of determining whether the touch signal moves to the another side of the touch screen comprises determining whether the touch point moves to the display area of the second type touch keyboard.

According to one embodiment of the present application, the step of determining the touch signal moves to the another side of the touch screen and displaying the second type touch keyboard on the another side of the touch screen further comprises closing the first type touch keyboard.

According to one embodiment of the present application, after the step of activating a character input function and displaying the first type touch keyboard on the side of the touch screen, the method further comprises receiving a key input from the first type touch keyboard and displaying a corresponding character on the touch screen.

According to one embodiment of the present application, the step of determining the touch signal moves to the another side of the touch screen and displaying the second type touch keyboard on the another side of the touch screen further comprises changing a display direction of characters in a character editing area of the touch screen and changing a display direction of characters in the second type touch keyboard, wherein the character editing area is an area of the touch screen excluding the second type touch keyboard.

According to one embodiment of the present application, after the step of determining the touch signal moves to the another side of the touch screen and displaying the second type touch keyboard on the another side of the touch screen, the method further comprises enabling the second type touch keyboard when the touch signal is terminated, and receiving a key input from the second type touch keyboard and displaying a corresponding character on the touch screen.

The present application provides a handheld electronic device capable of switching a touch keyboard. The handheld electronic device comprises a touch screen and a processing unit. The touch screen is used to detect a touch signal. The processing unit is used to switch a touch keyboard displayed on the touch screen to another one based on the touch signal detected by the touch screen. If a character input function is activated, a first type touch keyboard is displayed on a first side of the touch screen. If the touch signal is produced within a display area of the first type touch keyboard and moves to another side of the touch screen, a second type touch keyboard is displayed on the another side of the touch screen.

According to one embodiment of the present application, the processing unit determines whether the touch point moves to the display area of the second type touch keyboard to determine whether the touch signal moves to the another side of the touch screen.

According to one embodiment of the present application, after displaying the second type touch keyboard on the another side of the touch screen, the processing unit closes the first type touch keyboard.

According to one embodiment of the present application, the processing unit receives a key input from the first type touch keyboard and displays a corresponding character on the touch screen.

According to one embodiment of the present application, when it is determined that the touch signal moves to the another side of the touch screen, the processing unit changes a display direction of the characters in a character editing area of the touch screen wherein the character editing area is an area of the touch screen excluding the second type touch keyboard, and changes a display direction of the characters in the second type touch keyboard.

According to one embodiment of the present application, the processing unit further enables the second type touch keyboard when the touch signal is terminated, and receives a key input from the second type touch keyboard and displays a corresponding character on the touch screen.

According to one embodiment of the present application, the side of the touch screen comprises upper, lower, left, or right sides of the touch screen.

According to one embodiment of the present application, the first type touch keyboard and the second type touch keyboard comprises an English letter keyboard, a phonetic symbol keyboard, a numeric keyboard, a T9 keyboard, or a twenty-key keyboard.

According to one embodiment of the present application, the touch screen comprises a long side and a short side, the touch screen displays the English letter keyboard or the phonetic symbol keyboard when the touch point moves to the long side, and the touch screen displays one of the numeric keyboard, the T9 keyboard, and the twenty-key keyboard when the touch point moves to the short side.

According to one embodiment of the present application, the handheld electric device comprises a personal digital assistant or a personal digital assistant phone.

The present application further provides a storage medium which records a computer readable authority certification program for implementing the above-described touch keyboard switching method.

In the present application, different types of touch keyboards are displayed on different sides of the touch screen by dragging the keyboard. The touch keyboard is provided to the user based on the user's needs for inputting different types of characters, thus facilitating the user inputting the characters.

In order to make the aforementioned and other features and advantages of the present application more comprehensible, embodiments accompanied with figures are described in detail below.

DESCRIPTION OF THE EMBODIMENTS

Because the touch screen of the handheld electronic device is typically configured to have a rectangular shape, the best way for inputting English characters is to dispose an English letter keyboard, such as a QWERTY keyboard, on a long side of the touch screen for the user to operate with both hands. On the other hand, in the case of inputting English characters with single-hand operation, the best way is to dispose an English letter keyboard, such as a T9 keyboard or a twenty-key keyboard, on a short side of the touch screen. Besides, in the case of inputting numerals, the best way is to dispose a numeric keyboard, such as a T9 keyboard, on the short side of the touch screen for the user to operate with single hand. Therefore, the present application takes both the characteristics of the touch keyboards and the user's habits into account and appropriately switches different types of keyboards to be displayed on different sides of the touch screen, thereby facilitating inputting the characters. The application will now be described more fully with reference to the accompanying drawings, in which exemplary embodiments of the application are shown.

Figure 4:
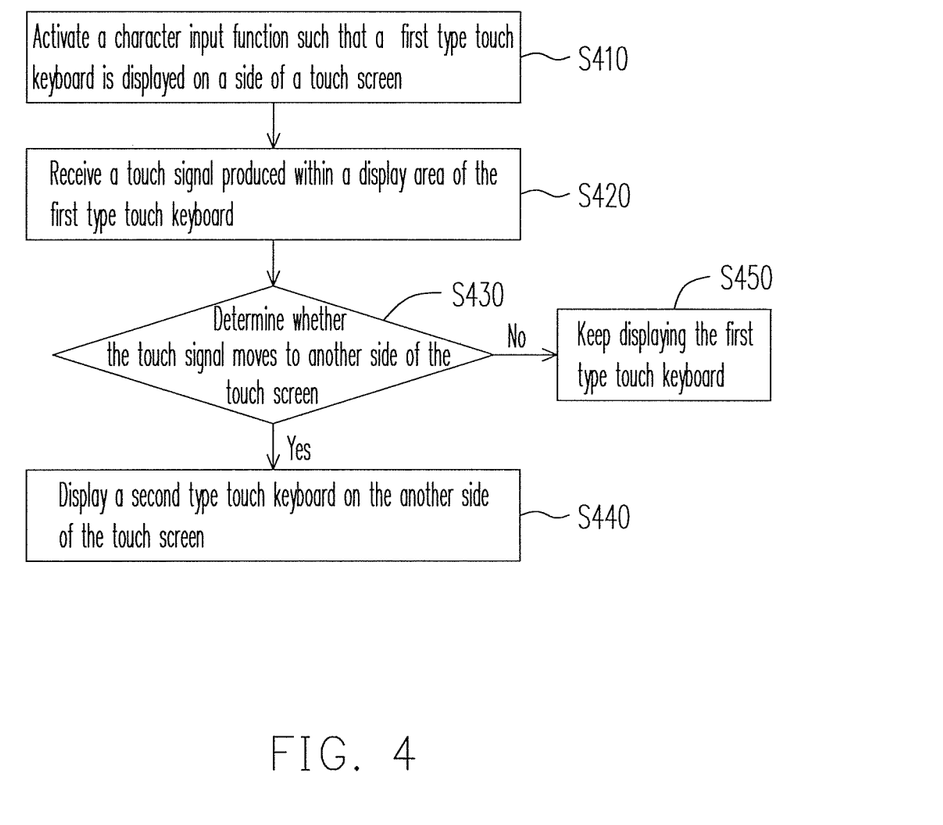
FIG. 4 is a flow chart of a method for a switching touch keyboard according to one embodiment of the present application.

FIG. 4 is a flow chart of a method for switching a touch keyboard according to one embodiment of the present application. As shown in FIG. 4, the present embodiment is suitable for a handheld electronic device with a touch screen. The touch screen is configured to have a rectangular shape with long and short sides. The handheld electronic device may be a personal digital assistant (PDA) or PDA phone in the present embodiment and may be other devices in alternative embodiments. The switching method of the present embodiment is described below in detail.

First, a character input function of the handheld electronic device is activated and a first type touch keyboard is displayed on one side of the touch screen (step S410). The character input function is activated, for example, when a certain function (e.g., dialing, message editing, or text editing) of the handheld electronic device is performed. The type of the first type touch keyboard displayed on the touch screen is determined based on the function being performed.

For example, when the dialing function is performed by the handheld electronic device, a numeric keyboard is displayed on the touch screen. When the message edit function is performed, an English letter keyboard is displayed on the touch screen. It should be noted, however, that there are no limits as to the type of first type touch keyboard. Rather, different types of touch keyboards (e.g., English keyboard, phonetic symbol keyboard, numeric keyboard, T9 keyboard, or twenty-key board) may be disposed on different sides (e.g., upper side, lower side, left side, or right side) of the touch screen according to needs.

At this time, if the user needs to use another type of keyboard to input characters (e.g., changing from an English letter input to a numeral input) or change the manner of input (e.g., changing from both-hand input to single-hand input), the user may change the type and location of the touch keyboard displayed on the touch screen by dragging the touch keyboard, such that characters can be easily and conveniently inputted.

Specifically, when dragging the touch keyboard, the user needs to press the first type touch keyboard and drag it to another side of the touch screen. At this time, the handheld electronic device receives a touch signal produced by the user within a display area of the first type touch keyboard (step S420). Upon receiving the touch signal, the handheld electronic device further determines whether the touch signal moves to another side of the touch screen (step S430). If yes, a second type touch keyboard is displayed on the another side of the touch screen (step S440). Otherwise, the handheld electronic device keeps displaying the first type touch keyboard (step S450).

In one embodiment, the touch signal may be generated by, for example, continuously touching a touch point within the display area of the first type touch keyboard, and the touch point may be an arbitrary point within the display area of the first type touch keyboard, or a point that is located in a specific area within the display area of the touch keyboard excluding a key. However, those are for the purpose of description only and should not be used to limit the present application. A further embodiment is discussed below in detail.

Figure 5:
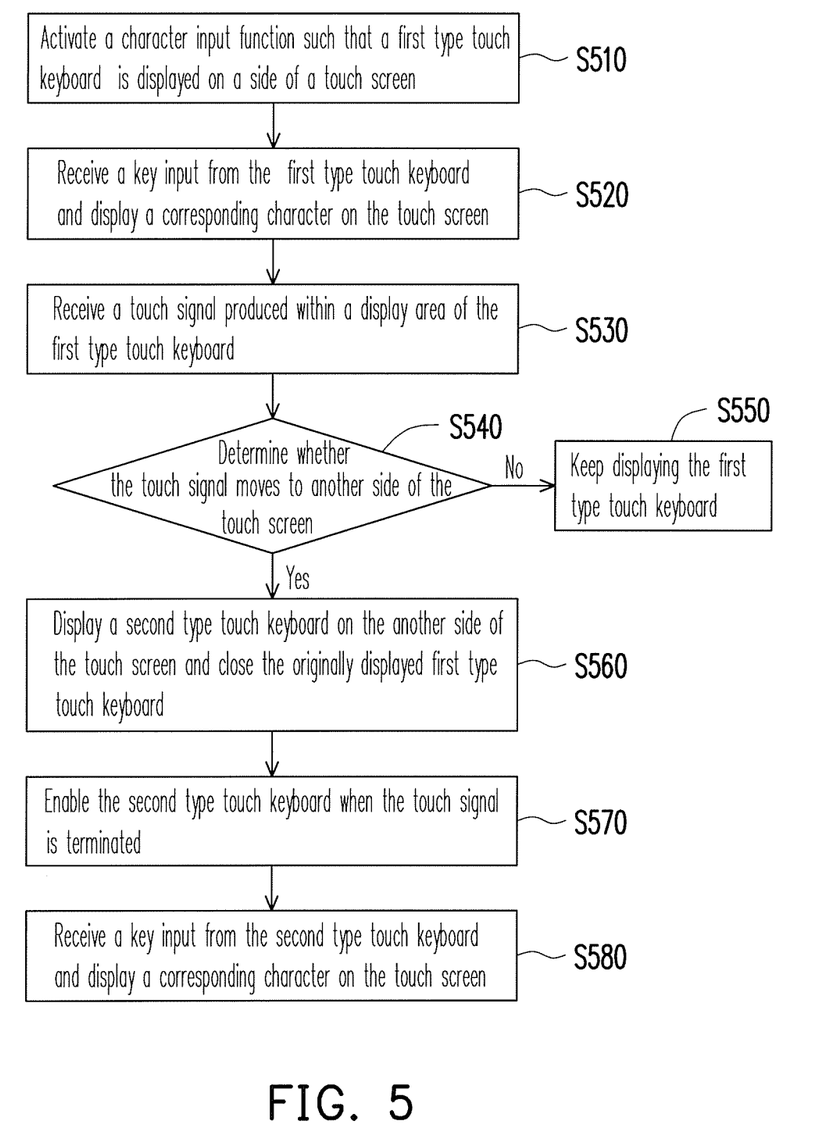
FIG. 5 is a flow chart of a method for switching a touch keyboard according to another embodiment of the present application.

FIG. 5 is a flow chart of a method for switching a touch keyboard according to another embodiment of the present application. As shown in FIG. 5, the present embodiment is suitable for a handheld electronic device with a touch screen. The handheld electronic device may be a PDA or PDA phone in the present embodiment and, in alternative embodiments, may be other devices.

First, a character input function of the handheld electronic device is activated and a first type touch keyboard is displayed on one side of the touch screen (step S510). With the first type touch keyboard being displayed, the user can input characters by pressing corresponding keys on the first type touch keyboard. At this time, the handheld electronic device receives key inputs from the first type touch keyboard and causes the corresponding characters to be displayed on the touch screen (step S520).

If the user needs to use another type of keyboard to input characters or change the input manner, the user may change the type and location of the touch keyboard displayed on the touch screen by dragging the touch keyboard. At this time, the handheld electronic device receives a touch signal produced by the user within a display area of the first type touch keyboard (step S530). The touch signal is generated by continuously touching a touch point within the display area of the first type touch keyboard, and the touch point may be an arbitrary point within the display area of the first type touch keyboard, or a point that is located in a specific area within the display area of the touch keyboard excluding a key. However, those are for the purpose of description only and should not be used to limit the present application.

Upon receiving the touch signal, the handheld electronic device further determines whether the touch signal moves to another side of the touch screen (step S540). Specifically, here, the handheld electronic device determines whether to perform the touch keyboard switching based on the determination whether the touch point moves to the display area of a second type touch keyboard.

If it is determined that the touch signal moves to the another side of the touch screen, the handheld electronic device displays the second type touch keyboard on the another side of the touch screen and closes the originally displayed first type touch keyboard (step S560). Otherwise, the handheld electronic device keeps displaying of the first type touch keyboard (step S550).

It should be noted that the present embodiment may further comprise enabling the second type touch keyboard when the touch signal is terminated (i.e., the user releases the touch keyboard that was being dragged) so that the handheld electronic device can receive key inputs from the second type touch keyboard and display corresponding characters on the touch screen (step S580).

By using the above-described method to switch between different touch keyboards, the user can then freely switch the touch keyboard as desired during character editing, thereby facilitating the character input. In an embodiment, because the touch screen typically has a long side and a short side, in order to facilitate the user inputting characters, the present application is configured such that, the English letter keyboard or phonetic symbol keyboard is displayed on the touch screen when the touch point moves to the long side; and the numeric keyboard, T9 keyboard, or twenty-key keyboard is displayed on the touch screen when the touch point moves to the short side. An embodiment for each of the above-described scenarios is described below in detail.

Figure 6:
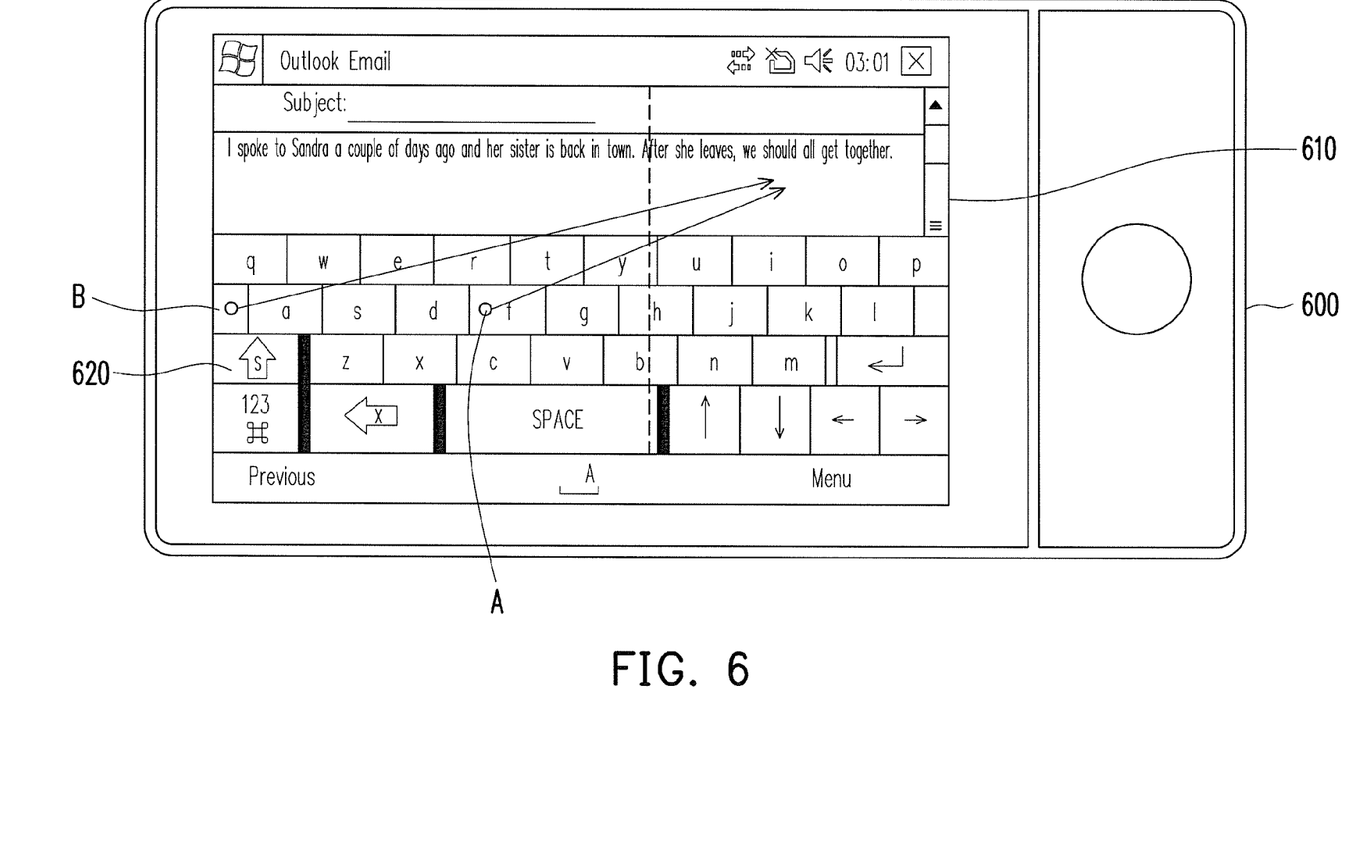
FIG. 6 shows a configuration of a touch keyboard of a handheld electronic device according to one embodiment of the present application.

FIG. 6 shows a configuration of a touch keyboard of a handheld electronic device according to one embodiment of the present application. As shown in FIG. 6, the handheld electronic device 600 is disposed in a landscape orientation and displays an English letter keyboard 620 on a lower portion of a touch screen 610 for allowing the user to input English characters. The user may switch the touch keyboard being displayed to another one by continuously pressing an arbitrary point (e.g., point A) within the display area of the English letter keyboard 620 or a point (e.g., point B) that is located in a specific area within the display area of the English letter keyboard 620 excluding a key, and dragging the point to a right portion of the touch screen.

Figure 7:
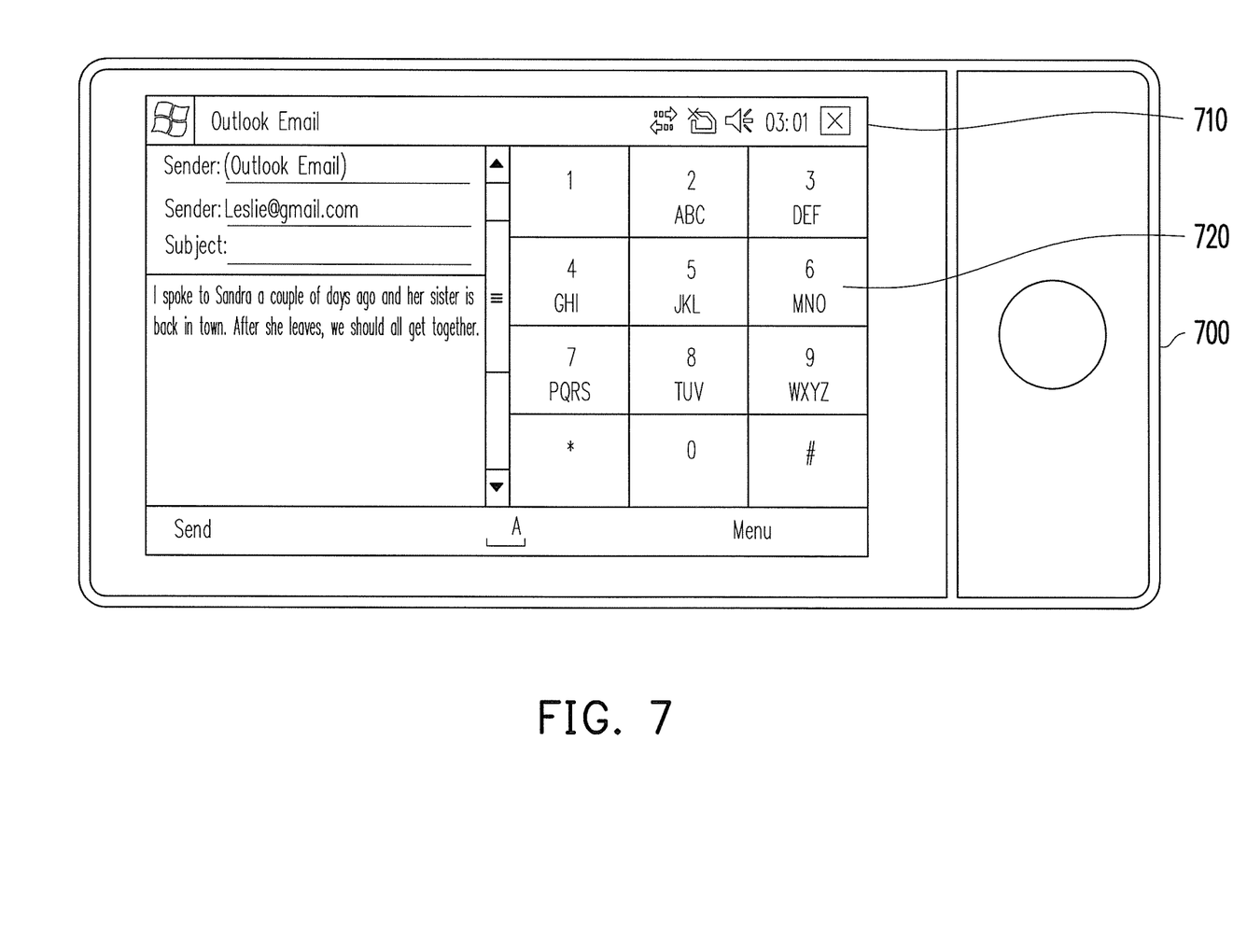
FIG. 7 shows a configuration of the touch keyboard of FIG. 6 after the touch keyboard has been switched.

FIG. 7 shows a configuration of the touch keyboard of FIG. 6 after the touch keyboard has been switched. As shown in FIG. 7, the handheld electronic device 700 is disposed in a landscape orientation and the touch keyboard displayed on the touch screen 710 has been switched to a numeric keyboard 720 for allowing the user to input numerals.

Figure 8:
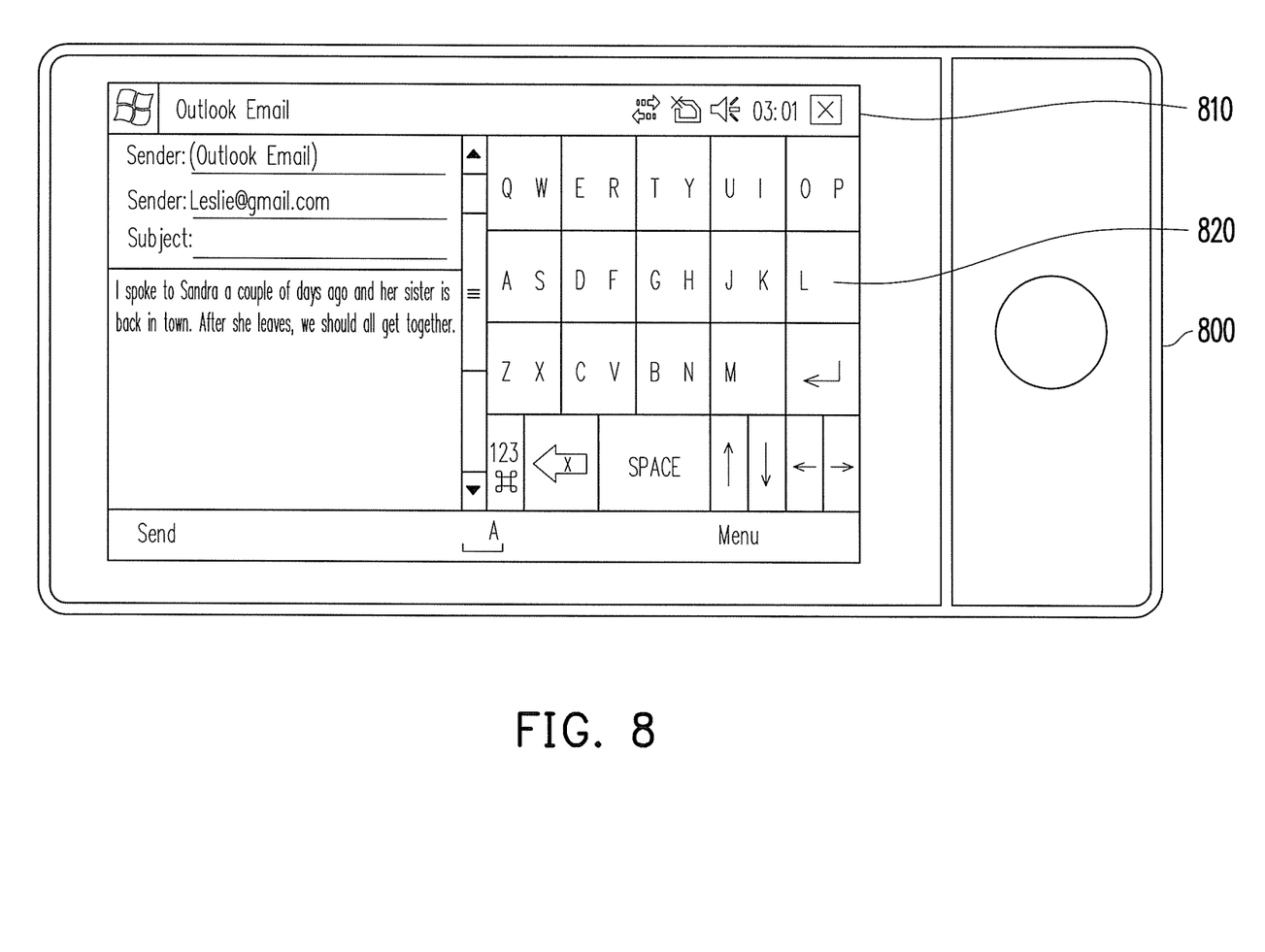
FIG. 8 shows a configuration of the touch keyboard of FIG. 6 after the touch keyboard has been switched.

FIG. 8 shows a configuration of the touch keyboard of FIG. 6 after the touch keyboard has been switched. As shown in FIG. 8, the handheld electronic device 800 is disposed in a landscape orientation and the touch keyboard displayed on the touch screen 810 has been switched to a twenty-key keyboard 820. When compared to the original English letter keyboard 620, the twenty-key keyboard 820 occupies a smaller area and is disposed closer to the right side, thus facilitating the user's single-hand operation. Besides, if the user desires to change from the right-hand-operation of the touch keyboard as illustrated in FIG. 8 to left-hand-operation, the user can switch the touch keyboard disposed closer to the right side as illustrated in FIG. 8 to a touch keyboard disposed closer to the left side.

The switching method for the touch keyboard is suitable for adjusting the type and location of the displayed touch keyboard when the handheld electronic device is disposed in a landscape or a portrait orientation so as to facilitate the user's operation. In the embodiments described above, the display direction of the characters in a character editing area of the touch screen remains unchanged. However, when inputting the same type of characters, the location of the touch keyboard can also be changed to allow the user selection of single-hand or both-hand input without departing from the present application. Specifically, in addition to displaying a second type touch keyboard on another side of the touch screen, the present application also comprises changing the display direction of the characters in the character editing area of the touch screen, thus allowing the user to operate the handheld electronic device in a different orientation.

For example, when inputting English letters, the user can choose to dispose the handheld electronic device in a landscape orientation and input characters using the English letter keyboard disposed on a lower portion of the touch screen. In this case, the displayed English letter keyboard is suitable for both-hand input and therefore can speed up the character input. On the other hand, if the user desires a single-hand input, the user can change the orientation of the English letter keyboard from landscape to portrait by dragging the touch keyboard as described in the touch keyboard switching method above. In this case, the user needs only to change the orientation of the handheld electronic device from original landscape to portrait to input characters with single hand, thus making the character input very convenient.

Figure 9:
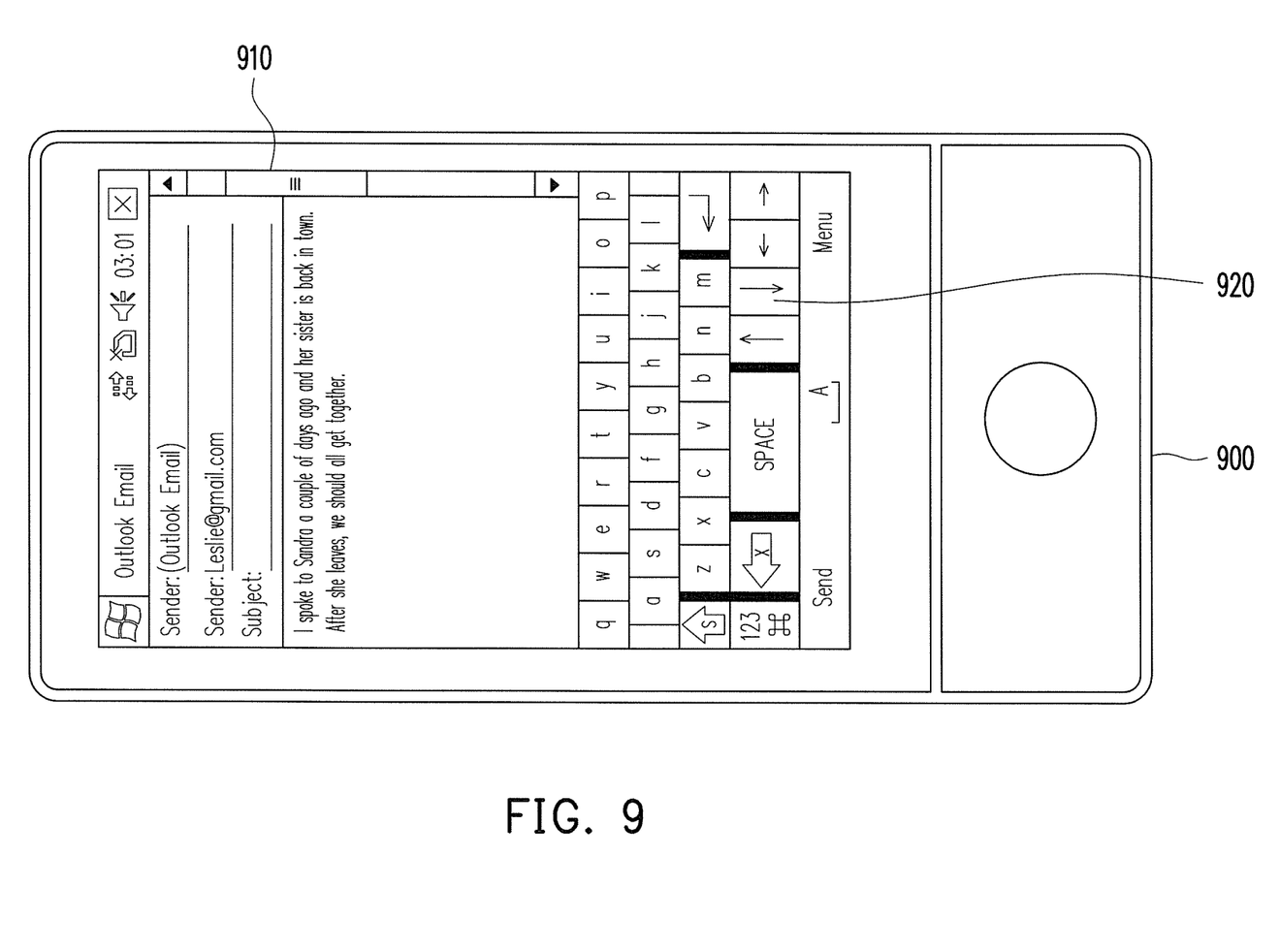
FIG. 9 shows a configuration of the touch keyboard of FIG. 6 after the touch keyboard has been switched.

FIG. 9 shows a configuration of the touch keyboard of FIG. 6 after the touch keyboard has been switched. As shown in FIG. 9, the handheld electronic device 900 is disposed still in a landscape orientation and the touch keyboard disposed on the touch screen 910 has been switched to the English letter keyboard 920 in a portrait orientation. At this time, if the orientation of the handheld electronic device 900 is changed to portrait, the English letter keyboard 920 is then disposed on a lower portion of the touch screen 910, thus facilitating the user's single-hand operation.

Figure 10:
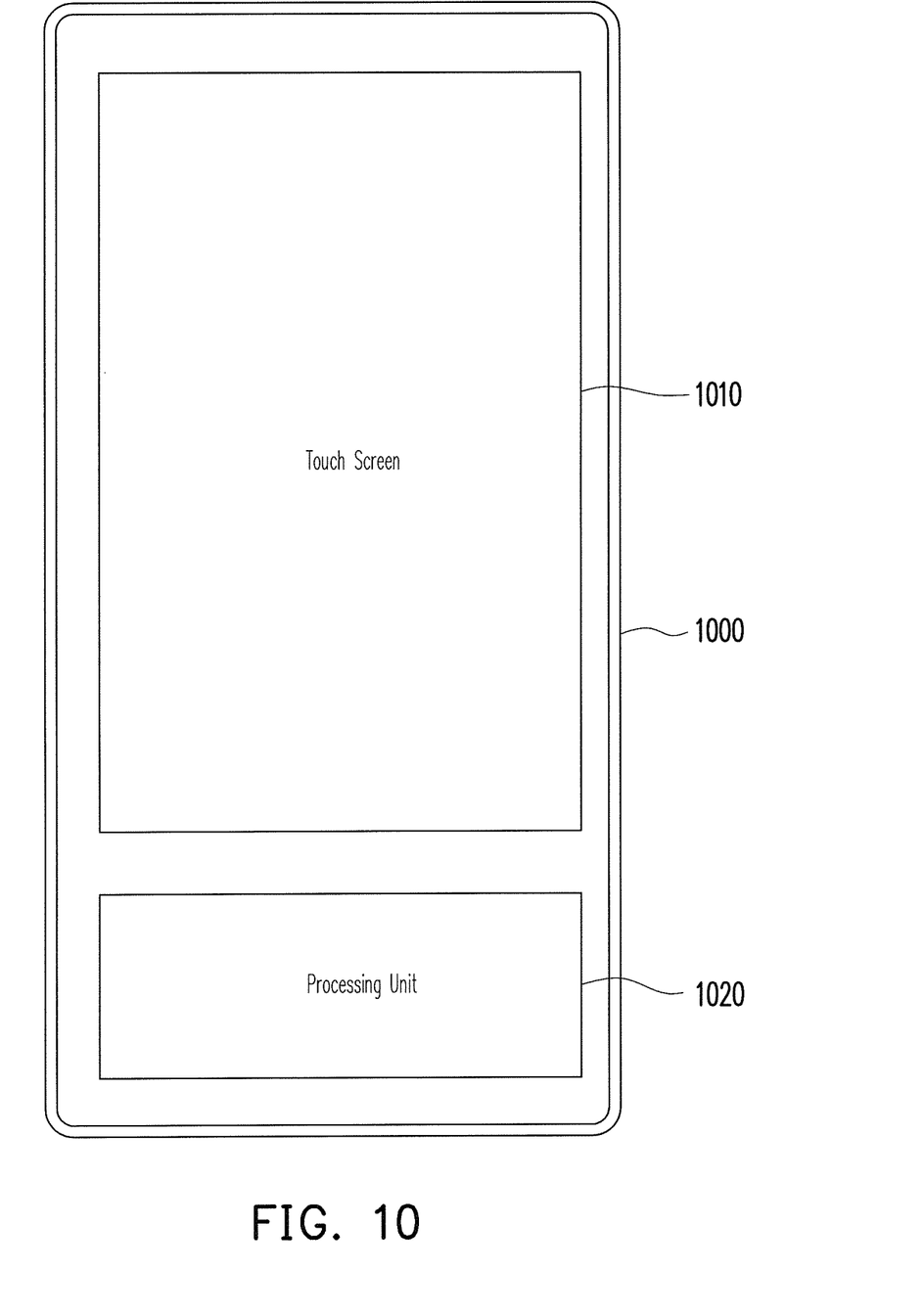
FIG. 10 is a block diagram of a handheld electronic device with a touch keyboard switch function according to one embodiment of the present application.

It should be noted that the above-described touch keyboard switching method can be implemented by hardware. For example, FIG. 10 is a block diagram of a handheld electronic device with a touch keyboard switching function. As shown in FIG. 10, the handheld electronic device 1000 of the present embodiment comprises a touch screen 1010 and a processing unit 1020. The touch screen 1010 is used to display images of the handheld electronic device 1000 and detect a touch signal produced by a user's touch. The processing unit 1020 switches the touch keyboard displayed on the touch screen 1010 based on the touch signal detected by the touch screen 1010. Specifically, if the processing unit 1020 determines that a character input function is activated, a first type touch keyboard is displayed on one side of the touch screen 1010. Next, if the processing unit 1020 determines that the touch signal is produced within a display area of the first type touch keyboard and moves to another side of the touch screen 1010, a second type touch keyboard is then displayed on the another side of the touch screen 1010. The method of switching the touch keyboard displayed on the touch screen 1010 by the processing unit 1020 is the same as the embodiments described above and explanation thereof is not repeated.

Furthermore, the present application provides a storage medium (e.g., an optical disk, a magnetic disk, or a removable hard disk) which records a computer readable authority certification program for implementing the above-described touch keyboard switching method. The authority certification program stored in the storage medium essentially consists of a plurality of code segments (e.g., creating organization chart code segment, form certification code segment, setting code segment, deployment code segment). The function of these code segments corresponds to the steps of the above method and the above functional block diagram of the handheld electronic device.

In view of the foregoing, the present touch keyboard switching method is used to display different types of touch keyboards on different sides of the touch screen by dragging the touch keyboard. As such, the user can freely switch the type and location of the touch keyboard as desired when inputting characters. In addition to switching of the touch keyboard, the present application can also change the display direction of the characters in an editing area such that the user can freely change the orientation of the handheld electronic device, thus providing flexibility and convenience in operation.

It will be apparent to those skilled in the art that various modifications and variations can be made to the structure of the present application without departing from the scope or spirit of the application. In view of the foregoing, it is intended that the present application cover modifications and variations of this application provided they fall within the scope of the following claims and their equivalents.

What is claimed is:

1. A method for switching a touch keyboard, adapted for a handheld electronic device having a touch screen, the method comprising:
   activating a character input function and displaying a first type touch keyboard on a side of the touch screen;
   receiving a touch signal produced within a display area of the first type touch keyboard;
   determining whether the touch signal moves to another side of the touch screen; and
   displaying a second type touch keyboard on the another side of the touch screen if it is determined that the touch signal moves to the another side of the touch screen,
   wherein the step of determining whether the touch signal moves to the another side of the touch screen comprises determining whether the touch point moves to the display area of the second type touch keyboard,
   wherein the display area of the second type touch keyboard is displayed along the another side of the touch screen, and the display area of the first type touch keyboard is displayed along the side of the touch screen,
   wherein a location of the second type touch keyboard on the another side of the touch screen is different from the location of the first type touch keyboard on the side of the touch screen.

2. The method for switching a touch keyboard according to claim 1, wherein the touch signal is produced by continuously touching a touch point within the display area of the first type touch keyboard.

3. The method for switching a touch keyboard according to claim 2, wherein the touch point is located in a specific area within the display area of the first type touch keyboard excluding a key.

4. The method for switching a touch keyboard according to claim 2, wherein the step of determining the touch signal moves to the another side of the touch screen and displaying the second type touch keyboard on the another side of the touch screen further comprises closing the first type touch keyboard.

5. The method for switching a touch keyboard according to claim 1, wherein, after the step of activating a character input function and displaying the first type touch keyboard on the side of the touch screen, the method further comprises receiving a key input from the first type touch keyboard and displaying a corresponding character on the touch screen.

6. The method for switching a touch keyboard according to claim 1, wherein the step of determining the touch signal moves to the another side of the touch screen and displaying the second type touch keyboard on the another side of the touch screen further comprises:
    changing a display direction of a plurality characters in a character editing area of the touch screen, wherein the character editing area is an area of the touch screen excluding the second type touch keyboard; and
    changing a display direction of the characters in the second type touch keyboard.

7. The method for switching a touch keyboard according to claim 1, wherein, after the step of determining the touch signal moves to the another side of the touch screen and displaying the second type touch keyboard on the another side of the touch screen, the method further comprises:
    enabling the second type touch keyboard when the touch signal is terminated; and
    receiving a key input from the second type touch keyboard and displaying a corresponding character on the touch screen.

8. A handheld electronic device capable of switching a touch keyboard, comprising:
    a touch screen for detecting a touch signal; and
    a processing unit for switching a touch keyboard displayed on the touch screen to another one based on the touch signal detected by the touch screen, wherein
    when a character input function is activated, a first type touch keyboard is displayed on a first side of the touch screen,
    if the touch signal is produced within a display area of the first type touch keyboard and moves to another side of the touch screen, a second type touch keyboard is displayed on the another side of the touch screen,
    wherein the processing unit determines whether the touch point moves to the display area of the second type touch keyboard to determine whether the touch signal moves to the another side of the touch screen,
    wherein the display area of the second type touch keyboard is displayed along the another side of the touch screen, and the display area of the first type touch keyboard is displayed along the side of the touch screen,
    wherein a location of the second type touch keyboard on the another side of the touch screen is different from the location of the first type touch keyboard on the side of the touch screen.

9. The handheld electronic device according to claim 8, wherein the touch signal is produced by continuously touching a touch point within the display area of the first type touch keyboard.

10. The handheld electronic device according to claim 9, wherein the touch point is located in a specific area within the display area of the first type touch keyboard excluding a key.

11. The handheld electronic device according to claim 9, wherein, after displaying the second type touch keyboard on the another side of the touch screen, the processing unit closes the first type touch keyboard.

12. The handheld electronic device according to claim 8, wherein the processing unit receives a key input from the first type touch keyboard and displays a corresponding character on the touch screen.

13. The handheld electronic device according to claim 8, wherein, when it is determined that the touch signal moves to the another side of the touch screen, the processing unit changes a display direction of a plurality of characters in a character editing area of the touch screen and changes a display direction of the characters in the second type touch keyboard, wherein the character editing area is an area of the touch screen excluding the second type touch keyboard.

14. The handheld electronic device according to claim 8, wherein the processing unit further enables the second type touch keyboard when the touch signal is terminated, and receives a key input from the second type touch keyboard and displays a corresponding character on the touch screen.

15. The handheld electronic device according to claim 8, wherein the side of the touch screen comprises upper, lower, left, or right sides of the touch screen.

16. The handheld electronic device according to claim 8, wherein the first type touch keyboard and the second type touch keyboard comprises an English letter keyboard, a phonetic symbol keyboard, a numeric keyboard, a T9 keyboard, or a twenty-key keyboard.

17. The handheld electronic device according to claim 8, wherein the touch screen comprises a long side and a short side, the touch screen displays the English letter keyboard or the phonetic symbol keyboard when the touch point moves to the long side, and the touch screen displays one of the numeric keyboard, the T9 keyboard and the twenty-key keyboard when the touch point moves to the short side.

18. A non-transitory storage medium for storing a computer program, the computer program comprising a plurality of codes to be loaded into a computer system to enable the computer system to implement a method for switching a touch keyboard, adapted for a handheld electronic device having a touch screen, the method comprising: activating a character input function and displaying a first type touch keyboard on a side of the touch screen; receiving a touch signal produced within a display area of the first type touch keyboard; determining whether the touch signal moves to another side of the touch screen; and displaying a second type touch keyboard on the another side of the touch screen if it is determined that the touch signal moves to the another side of the touch screen, wherein the step of determining whether the touch signal moves to the another side of the touch screen comprises determining whether the touch point moves to the display area of the second type touch keyboard, wherein the display area of the second type touch keyboard is displayed along the another side of the touch screen, and the display area of the first type touch keyboard is displayed along the side of the touch screen, wherein a location of the second type touch keyboard on the another side of the touch screen is different from the location of the first type touch keyboard on the side of the touch screen.

* * * * *